March 31, 1953
JOHN P. FRANCESCO
NOW BY JUDICIAL CHANGE OF NAME
JOHN PATSY FRANCIS
WINDSHIELD VISOR AND FLUID SEAL
ROOF SUPPORTING MEANS THEREFOR
Filed April 3, 1950
2,633,381
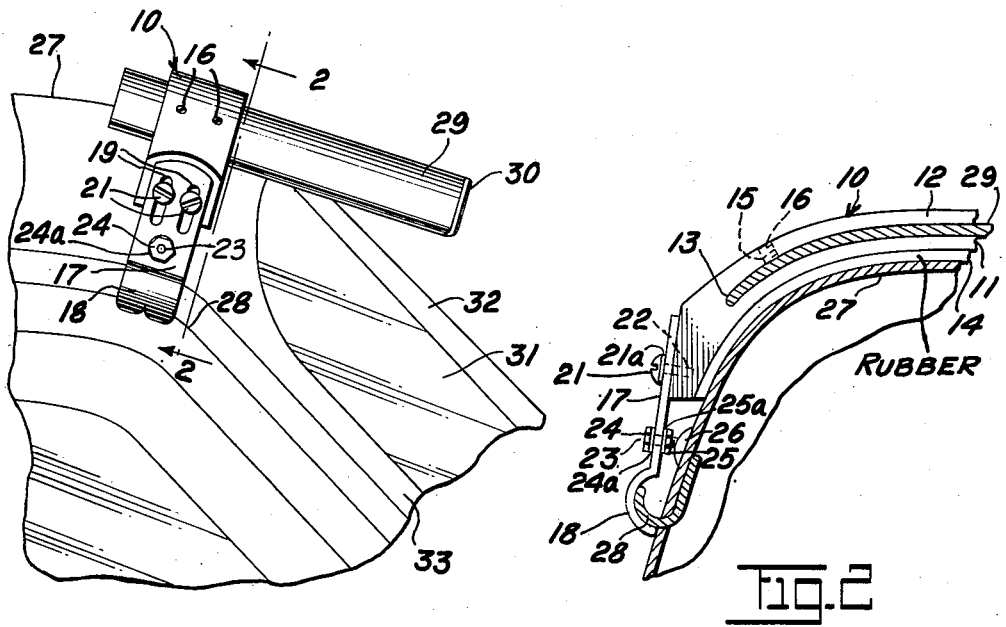
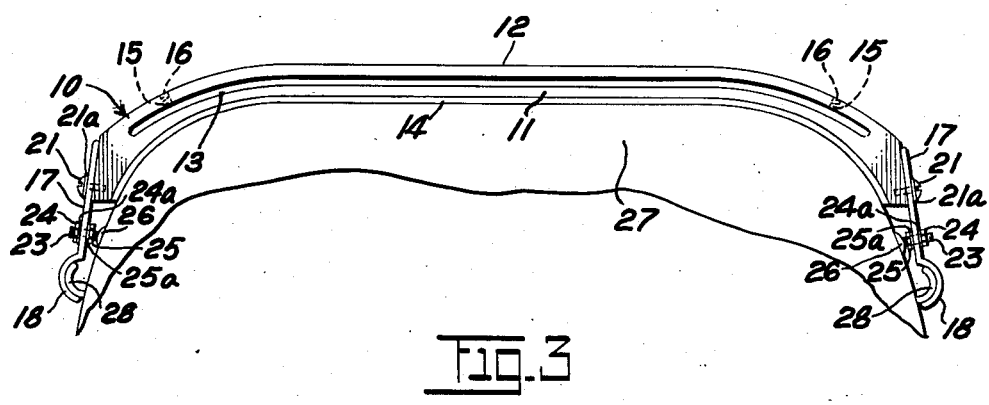
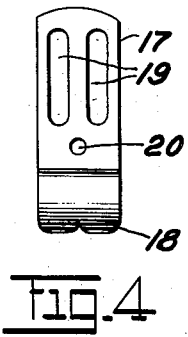
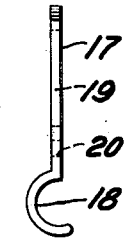
*INVENTOR*
John P. Francesco
NOW BY JUDICIAL CHANGE OF NAME TO
JOHN PATSY FRANCIS Patented Mar. 31, 1953

2,633,381

UNITED STATES PATENT OFFICE 2,633,381

WINDSHIELD VISOR AND FLUID SEAL ROOF SUPPORTING MEANS THEREFOR

John P. Francesco, Haverhill, Mass., now by judicial change of name John Patsy Francis Application April 3, 1950, Serial No. 153,534

6 Claims. (Cl. 296—95)

My improvement pertains to supporting means for supporting a sunshade or a visor for use over the roof above the windshield of a motor vehicle, the visor being mounted so that it may be extended, retracted, removed when not needed, or replaced by another visor.

An object of my invention is to provide a sunshade or visor of simple construction, devoid of conventional side brackets, center strip braces, or struts generally employed directly to a visor in supporting said visor to a motor vehicle, making it possible also for the installation and removal of the visor a simple operation to and from my supporting means therefor.

Another object of my invention is to provide a demountable support laterally contiguous with the roof of the body of a motor vehicle above the windshield, the location of the said support in relation to the slope of the roof forming the angle for the visor, engaged within the said support, to suit the operator's vision and purpose therefor.

A still further object of my invention is to provide substantial protection to the windshield from sleet, snow, rain, and the formation of ice thereon, with the base of the support, in fluid sealing engagement with the roof, preventing said precipitation from descending from the forward slope of the roof upon the windshield.

Still another object of my invention is to eliminate visibility hazards due to sleet, snow, and rain and to create an aid to visibility when viewing out-door movies at drive-in theatres, eliminating the continuous or repeated on and off use of the motor or auxiliary means to operate the windshield wipers.

With these and other objects in view, as will hereafter more fully appear, the invention comprises certain novel combinations, constructions and arrangement of parts as will be hereinafter described and claimed and as illustrated in the accompanying drawings, in which like parts are designated by like numerals, and in which:

Figure 1 is a side view of a portion of a motor vehicle top including the windshield, and showing my invention attached thereto with a visor in extended position over the windshield.

Figure 2 is a cross-sectional view taken substantially on line 2—2 of Figure 1.

Figure 3 is a front elevation view of the support, without the visor supported therefrom, shown in sealing engagement with the roof of the body of the motor vehicle and fastening brackets attached to said support and to the rain gutters of the said motor vehicle.

Figure 4 is a side elevation view of a bracket showing the longitudinal slots for engaging the bolts therethrough and an aperture engaging the threaded rod member of the vacuum cup.

Figure 5 is a front edge elevation view of Figure 4.

Referring now more specifically to the drawings, attention is directed first to Figure 1, wherein numeral 10 generally indicates the support for supporting the visor 29 in an extended position over the windshield 31. The sunshade or visor 29, made preferably of a thin plate or other suitable rigid material with parallel sides a substantial length thereof to permit the retraction of said visor, has a bead 30 disposed along the outer edge to add rigidity to said visor and serves as a means to partially withhold water from dripping over the said outer edge of the visor. The bead 30 also serves as a stop when the visor is fully retracted to prevent any further retractable movement thereof when the threaded plugs 16, Figure 3, are not in clamping engagement with said visor.

The sunshade or visor 29 may be constructed of any suitable rigid material such as sheet metal, Masonite, plywood, or other composition and it may be opaque, translucent, or transparent to suit the operator's purpose therefor with removal and insertion of a changeable visor a simple operation. In the use of material not capable of forming a bead 30 on the outer edge of the visor, a substantially U-shaped channel member (not shown) is attached to said outer edge to add rigidity and to serve the purposes to which references have been made thereto.

The support 10, Figures 2 and 3, constructed of metal, wood, or other suitable composition capable of supporting a visor under various driving conditions has a base 11 to conform substantially with the contour of the roof 27, from one side to the other, and is of a length to engage the fastening brackets 17 secured to the rain gutters 28. A substantially arcuate slot 13 in said support engages the visor 29 therethrough for extended or retracted movement of said visor. It is to be understood that the arcuate slot 13 is preferably constructed in contour to substantially suit the lateral contour of the roof of a motor vehicle to reduce the height of the support. In clamping the visor 29 within the slot 13, plug screws 16, having a screw driver engaging slot at the outer ends thereof, and engaging the threaded openings 15 of the top member 12 are rotated to complete the clamping engagement of the said plug screws 16 and visor 29, to secure said visor in the desired position.

Forming a part of the base 11, of the support 10, is a resilient member 14, such as rubber, adhesively attached to said base 11 and engaging the roof 27 as a fluid sealing means and also serving as a friction member, or as a friction means only, to substantially prevent movement of said support or damage to the appearance of the said roof when installing or removing the support 10 therefrom. Located in the top member 12, of the support 10, are threaded openings 15 and at the outer ends of said support are the threaded openings 22 to receive the bolts 21 for clamping the fastening brackets 17 to the support.

To secure the support 10 in position, fastening brackets 17 having longitudinal slots 19 and an aperture 20, Figures 4 and 5, with an arcuate lower end 18 to engage the rain gutters 28, are secured to said rain gutters with the bolts 21, having washers 21a, engaging the said longitudinal slots 19 and the threaded openings 22 at the outer ends of said support. The vacuum cup 26, secured to the roof 27 and having a threaded rod member 23, bent to suit the angle therefrom, and extending through the aperture 20, is then clampingly engaged to said bracket 17 by adjusting the inner nut 25, with washer 25a, to further compress the vacuum cup 26 to the roof, and then adjusting the outer nut 24, with washer 24a, to the bracket 17. The individual fastening brackets 17 are held firmly in place by the threaded rod member 23, with the inner nut 25 and outer nut 24, having washers therebetween, engaging both sides of each of said brackets, the threaded rod member 23 being extended from the vacuum cup 26 which is compressed to the roof, and upon detachment of the support 10, said brackets remain held in said position.

Referring back to Figure 1, a portion of a motor vehicle 33 and roof 27 including the windshield 31 is shown with the center strip 32 of said vehicle.

In Figure 2, taken substantially on line 2—2 of Figure 1, is shown the resilient member 14, made of rubber or other resilient composition engaging the roof 27 for the purposes to which references have been made. The fastening bracket 17 is arcuately bent substantially semicircularly at 18 to encompass the curved section of the rain gutter 28, which is, in a majority of motor vehicles, located along the edge of the roof thereof in a line configurative with the top thereof and extending downwardly to the lower edge of the windshield. The longitudinal slots 19 of said bracket are for adjustably engaging the support 10 when seated upon the roof 27, due to the variations of vertical height between the rain gutter 28 and the threaded opening 22, which are encountered in the various makes of motor vehicles and also to allow the support to be compressed to the roof in fluid seal or friction engagement therewith.

Plug screws 16 located in the top member 12, of the support 10, are adapted to engage with the visor to further clamp the said visor in the desired position.

The visor 29, of rigid construction, is molded or pressed to shape to conform with the slot 13 of the support and is preferably of a thickness and width to fully engage said slot 13 to prevent any lateral or vertical movement of said visor when the motor vehicle is in motion.

The main advantages of my supporting means for supporting a retractable windshield visor reside in the fluid sealing engagement of said supporting means with the exterior lateral portion of the roof of the body of a motor vehicle in preventing sleet, snow, and rain from descending from the forward slope of the roof upon the windshield and also upon the visor, and to substantially prevent ice forming on said windshield, without forming openings in the roof or body of said vehicle, or defacing the appearance thereof in supporting said visor over the roof of said vehicle.

From the foregoing description taken in connection with the accompanying drawings, it will be manifest that a supporting means for supporting a windshield visor over the roof of a motor vehicle is provided that will fulfill all the necessary requirements of such a device, but as changes could be made in the aforesaid description and apparently different embodiments of the invention may be constructed within the scope of the appended claims, without departing from the spirit or scope thereof, it is intended that all matters contained in the said accompanying specification and drawings shall be interpreted as illustrative and not in a limitative or restricted sense, and I do not wish to be limited except by the prior art and by the scope of the appended claims.

I claim:

1. Fluid seal supporting means for supporting a windshield visor over the roof of a motor vehicle, comprising a support having the base thereof substantially in contour with the exterior lateral portion of the roof top for lateral engagement therewith and a substantial distance from the top of the windshield, said support encompassing and engaging the upper and lower surfaces of the rear portion of said visor in supporting said visor a substantial distance over the windshield, sealing means on said support laterally contiguous with the said roof and in fluid sealing engagement therewith, and fastening means including a lower portion for engaging the gutters, and an upper portion provided with slots, and means passing through said slots and into the support, whereby said fastening means serves to adjustably seat and clamp said support downwardly in compressed fluid sealing engagement upon the roof of said vehicle.

2. Fluid seal supporting means for supporting a windshield visor over the roof of a motor vehicle, comprising a support having an arcuate slot formed in said support and having the base thereof substantially in contour with the exterior lateral portion of the roof top for lateral engagement therewith and a substantial distance from the top of the windshield, said slot in said support encompassing and engaging the upper and lower surfaces of the rear portion of said visor in supporting said visor a substantial distance over the windshield, sealing means on said support laterally contiguous with the roof in fluid sealing engagement therewith, and fastening means including a lower portion for engaging the gutters, and an upper portion provided with slots, and means passing through said slots and into the support, whereby said fastening means serves to adjustably seat and clamp said supported downwardly in compressed fluid sealing engagement upon the roof of said vehicle.

3. Fluid seal supporting means for supporting a windshield visor over the roof of a motor vehicle, comprising a support having the base thereof substantially in contour with the exterior lateral portion of the roof top for lateral engagement therewith and a substantial distance from the top of the windshield and having an arcuate slot therein engaging the upper and lower surfaces of the rear portion of said visor and supporting the visor for manual outward or rearward movement, a resilient base member of said support laterally contiguous with said roof and in fluid sealing engagement therewith, and fastening means adjustably securing said support in lateral fluid sealing engagement upon the roof of said vehicle, said fastening means comprising brackets having a lower portion for engaging the gutters, and an upper portion provided with slots, and means passing through said slots and into the support, whereby said fastening means serves to adjustably seat and clamp said support downwardly in compressed fluid sealing engagement upon the roof of said vehicle.

4. Fluid seal supporting means for supporting a windshield visor over the roof of a motor vehicle, comprising a support having the base thereof substantially in contour with the exterior lateral portion of the roof top for lateral engagement therewith and a substantial distance from the top of the windshield and having an arcuate slot therein engaging the upper and lower surfaces of the rear portion of said visor and supporting the visor for outward or rearward manual movement, a resilient base member of said support laterally contiguous with said roof and in fluid sealing engagement therewith, clamping means on said support comprising threaded means to clampingly engage said visor in an unmovable position within said support, and fastening means adjustably engaging said support to seat said support in fluid sealing engagement upon the roof of said vehicle, said fastening means comprising brackets having a lower portion for engaging the gutters, and an upper portion provided with slots, and means passing through said slots and into the support, whereby said fastening means serves to adjustably seat and clamp said support downwardly in compressed fluid sealing engagement upon the roof of said vehicle.

5. In combination with a windshield visor of rigid construction having substantially parallel sides and supported over the roof of a motor vehicle, a support having the base thereof substantially in contour with the exterior lateral portion of the roof top for lateral engagement therewith and a substantial distance from the top of the windshield, said support encompassing and engaging the upper and lower surfaces of the rear portion of said visor in supporting said visor a substantial distance over the windshield, resilient base means on said support laterally contiguous with said roof in friction engagement therewith, and fastening means including a lower portion for engaging the gutters, and an upper portion provided with slots, and means passing through said slots and into the support, whereby said fastening means serves to adjustably seat and clamp said support downwardly in compressed friction engagement upon the roof of said vehicle.

6. In combination with a retractable visor of rigid construction having substantially parallel sides and supported above the roof over the windshield of a motor vehicle, a support having the base thereof substantially in contour with the exterior lateral portion of the roof top for lateral engagement therewith and a substantial distance from the top of the windshield and having a resilient base laterally contiguous with the roof of said vehicle and in friction engagement therewith, an arcuate slot in said support engaging the upper and lower surfaces of the rear portion of said visor and supporting said retractable visor, and fastening means including a lower portion for engaging the gutters, and an upper portion provided with slots, and means passing through said slots and into the support, whereby said fastening means serves to adjustably seat and clamp said support downwardly in compressed friction engagement upon the roof of said vehicle.

JOHN P. FRANCESCO,
*Now by judicial change of name John Patsy Francis.*

REFERENCES CITED

The following references are of record in the file of this patent:

UNITED STATES PATENTS

| Number | Name | Date |
|---|---|---|
| 1,478,279 | Henne | Dec. 18, 1923 |
| 2,447,246 | Groboski et al. | Aug. 17, 1948 |
| 2,458,918 | Rea | Jan. 11, 1949 |